United States Patent

[11] 3,607,188

| [72] | Inventors | George W. Stilley<br>Freeport;<br>Herbert W. Eilenfeld, Brackenridge, both of Pa. |
|---|---|---|
| [21] | Appl. No. | 847,883 |
| [22] | Filed | Aug. 6, 1969 |
| [45] | Patented | Sept. 21, 1971 |
| [73] | Assignee | PPG Industries, Inc.<br>Pittsburgh, Pa. |

[54] METHOD AND APPARATUS FOR BENDING GLASS SHEETS
10 Claims, 5 Drawing Figs.

[52] U.S. Cl. .................................................. 65/106, 65/273, 65/275
[51] Int. Cl. .................................................. C03b 23/02
[50] Field of Search ......................................... 65/105, 106, 93, 94, 275, 285, 273

[56] References Cited
UNITED STATES PATENTS

| 1,671,548 | 5/1928 | Schlitzer.................... | 65/105 |
| 3,459,521 | 8/1969 | Nedelec ...................... | 65/106 X |

FOREIGN PATENTS

| 104,982 | 8/1938 | Australia...................... | 65/275 |

Primary Examiner—Arthur D. Kellogg
Attorney—Chisholm and Spencer

ABSTRACT: Apparatus and method for shaping glass into spherical shapes by extrusion using a ring support, a plunger movable from above to below said ring support and means other than a mold shaping surface for receiving the shaped glass disposed below the ring support.

PATENTED SEP 21 1971 3,607,188

INVENTORS
GEORGE W. STILLEY
HERBERT W. EILENFELD

BY Chisholm and Spencer
ATTORNEYS

METHOD AND APPARATUS FOR BENDING GLASS SHEETS

BRIEF DESCRIPTION OF THE INVENTION

This invention relates to apparatus for shaping glass sheets into spherical shapes. The shapes form part of glass spheres, which are useful in deep submergence studies because of the optical and structural properties of glass under large compression stresses. The spheres are preferably fabricated from the spherical shapes produced by the apparatus of the present invention using the technique disclosed and claimed in U.S. Pat. No. 3,450,082 to Henry M. Demarest, assigned to PPG Industries.

Hemispheres used in deep submergence studies are thicker than glass sheets used in automobiles. Hence, the gravity sag technique suitable for shaping glass sheets to form curved windows for automobiles would be too slow to shape the thicker glass sheets to be processed into spherical shapes. Higher temperatures needed to sag thicker glass sheets by gravity to shape in a reasonable time for production purposes may easily reach the level where glass devitrifies. Using pressure to accelerate the shaping of thick glass sheets at temperatures below devitrification temperature is well known. Such a plunger-type operation in combination with a gravity sag operation is disclosed in U.S. Pat. No. 3,414,395 to Thomas J. Reese and Russell J. Corsi, assigned to PPG Industries. This latter patented technique applies a plunger pressure until the glass is close to the shaping surface of a receiving mold and the final bend is produced by sagging without additional plunger pressing. This patented technique minimizes surface marking due to simultaneous engagement of the opposite glass sheet surfaces by the convex surface of the plunger and the concave surface of the receiving mold. This improvement in surface appearance involves increasing the total time of the shaping operation from that required for a pure press plunger operation to one that is intermediate the time required for a pure press plunger operation and the time required for a pure-sagging operation.

It has now been found that the time required to shape thick glass into spherical shapes can be further reduced almost to the time needed for a pure plunger pressing technique by an extrusion-type operation. This is accomplished by using a mold comprising a ring to support the undersurface of a glass sheet to be bent around its marginal portion only, and a plunger having a convex spherical surface facing downward that engages the upper surface of the glass sheet. The radius of the plunger is less than that of the inner radius of the ring by an amount approximating the thickness of the glass to enable the plunger to move from above the ring to below the ring and extrude the heat-softened glass. A receiving pad is disposed below the ring to receive the glass sheet bent to a spherical shape. The plunger is apertured and a pressure line for supplying hot air under pressure for discharge through the apertured wall of the plunger helps release the bent glass from embrace with the plunger. The ring has an upper surface that has an outer circular edge having a radius at least equal to the radius of the periphery of a glass sheet supported thereon for bending. The upper surface has an outer edge portion in a horizontal plane and an inner edge portion that is sloped downward and inward and has an inner circular edge whose radius approximates the radius desired for the outer surface of the bent glass.

An illustrative embodiment of apparatus conforming to the present invention will be described in order to facilitate understanding of the present invention. In the drawings forming part of this description, wherein like reference numbers refer to like structural elements.

Figure 1:
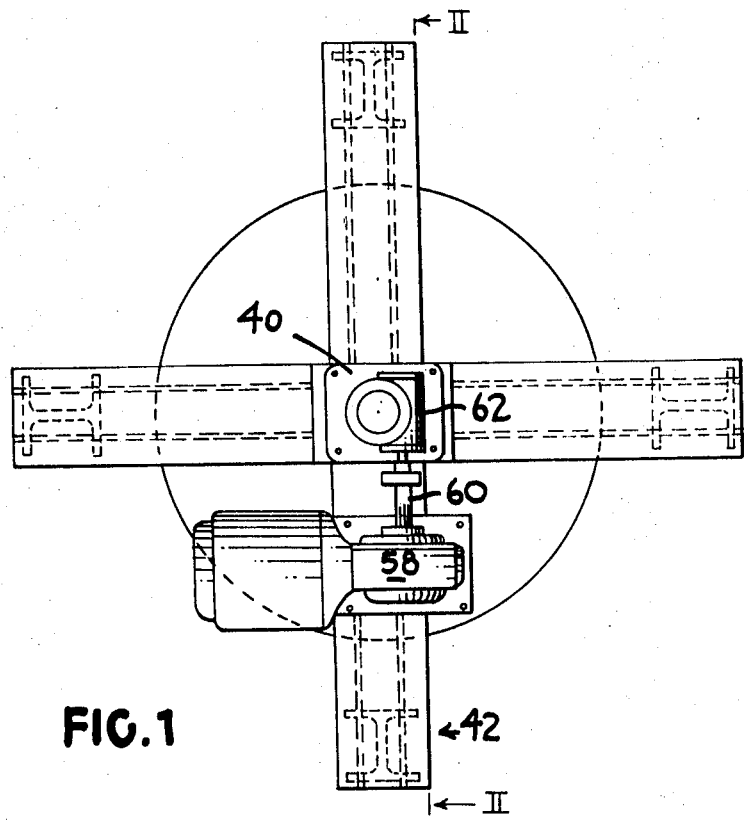
FIG. 1 is a fragmentary plan view of apparatus conforming to the present invention.
Figure 2:
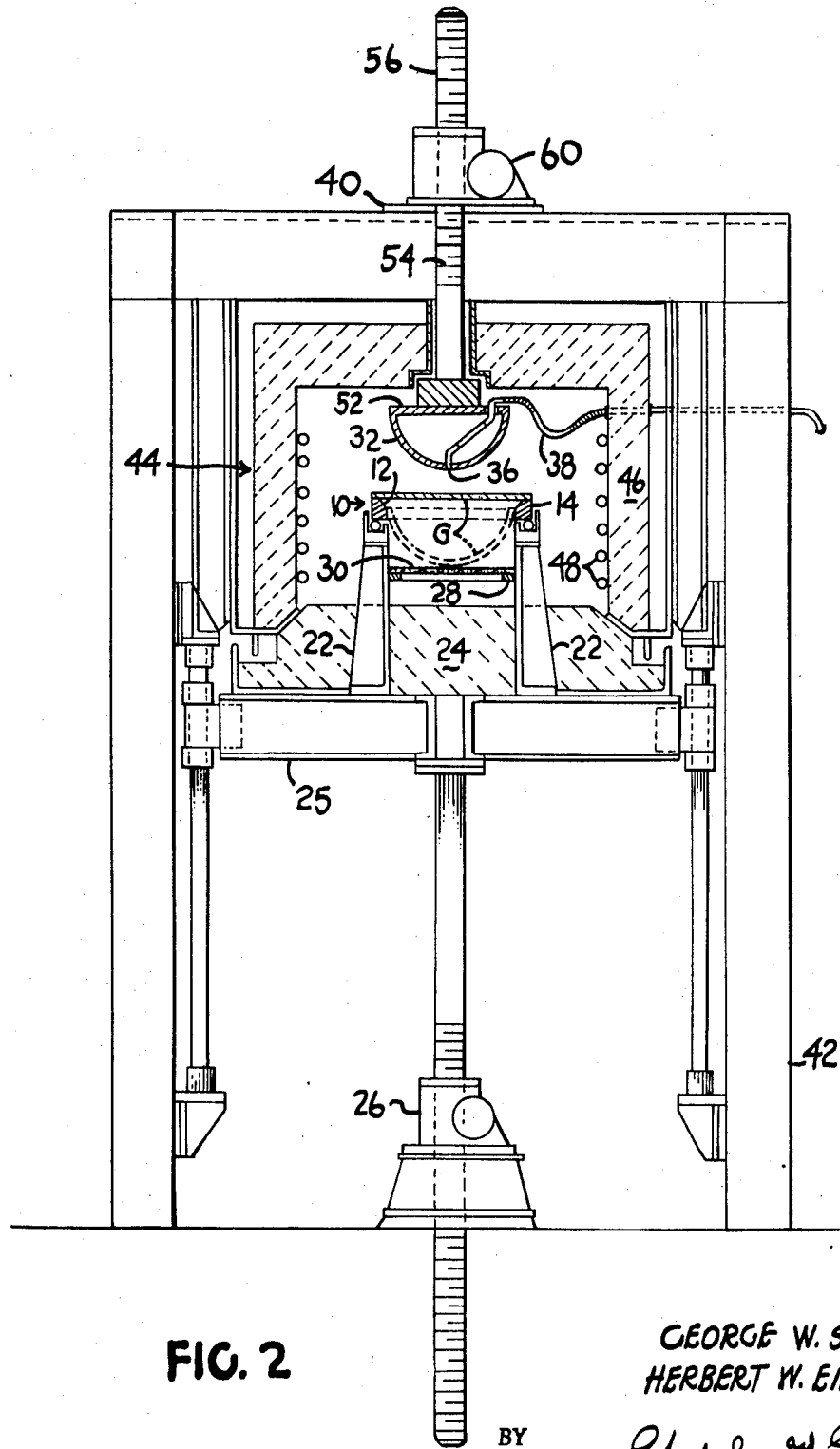
FIG. 2 is an elevational sectional view of said apparatus taken along the lines II—II of FIG. 1 with certain parts removed to show other parts more clearly.

FIGS. 1 and 2 show a mold and furnace for bending a glass sheet to a spherical section, preferably a hemisphere and comprises an open metal ring 10 having an upper surface 12 extending from an upper outer edge 14 to a lower inner edge 16. The upper outer edge portion of surface 12 forms a circular horizontal ledge 18 and the inner edge portion of surface 12 forms a frustoconical ledge 20 in a downwardly inward direction. The ring 10 is supported in a horizontal plane by a ring support structure 22. The latter is supported on a refractory floor 24 mounted on a metal support 25, whose vertical position is controlled by a jackscrew 26. The ring support structure 22 includes a ring support 28 for supporting an asbestos pad 30 below said ring 10. The ring 10 and pad 30 are so disposed that the vertical distance from the horizontal plane intersecting the circular inner edge 16 of the ring 10 to the pad 30 is slightly more than the radius of the hemisphere to be formed for reasons to be explained later.

The bending apparatus also comprises a plunger 32 in the form of a metal chamber having a downward facing wall 34 of convex contour shown as a hemisphere in the drawings. The lower surface of wall 34 and the upper surface 12 of ring 10 are preferably coated with boron nitride.

The wall 34 is provided with one or more apertures 36. An air supply line 38 connects the aperture 36 to a source of air under pressure (not shown) for purposes to be described later. A valve (not shown) is included in said air supply line 38 to control the flow of fluid as desired.

The plunger 32 is supported for vertical movement relative to an upper platform 40 carried by an open frame 42 that supports a cylindrical oven 44. The latter comprises a circular vertical wall 46 supporting heating elements 48 and a roof 50.

The plunger 32 has a flat upper wall 52 apertured to receive the air supply line 38. The upper wall is attached to the bottom end of a vertical rod 54 that is externally threaded and moves vertically within a vertical housing 56 fixed to upper platform 40. A motor 58, drive shaft 60 and spur gearing in a gear housing 62 control the position of the plunger 32 relative to the upper platform 40.

Figures 3, 4, 5:
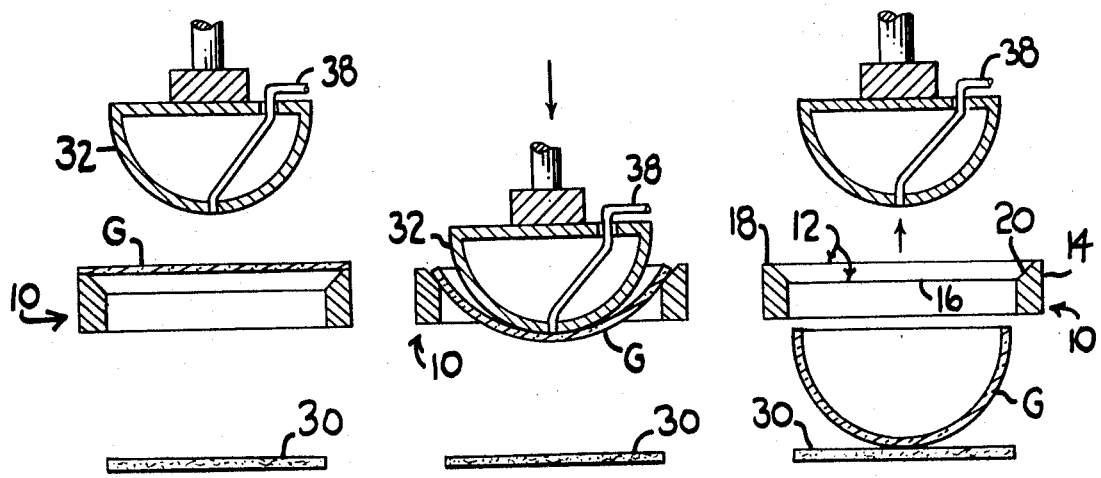
FIGS. 3, 4 and 5 are schematic views illustrating different steps of a bending operation using the apparatus of FIG. 1.

The externally threaded rod 54 is oriented for vertical movement and is sufficiently long to lift the plunger 32 to an upper position where it is completely above the upper most horizontal plane occupied by the outer edge 14 of the ring 10. In this position, a glass sheet G to be bent to a hemispherical shape is mounted concentrically on the ring 10 with the plunger 32 sufficiently high to permit clearance for mounting the glass sheet. This arrangement is shown in FIG. 3.

The loaded ring 10 is then lifted into the cylindrical oven 44 by using the jackscrew 26 to raise the support 25 for the movable furnace floor 24, thereby closing the oven 44.

The electrical heating elements 48 are then energized to raise the glass to its deformation temperature (1,180° F. for soda-lime glass ½-inch thick). The plunger 32 is lowered into contact with the upper glass sheet surface while the glass is heated, with its pole engaging the center of the glass disc, thereby accelerating the shaping of the glass at a temperature below that at which the glass would sag without plunger pressure. The plunger 32 is lowered intermittently at an average rate of 50 inches per hour when producing 10-inch-diameter hemispheres of glass ½-inch thick. Pulsing the movement of the plunger allows the glass to recover its elasticity between plunger movements.

The periphery of the glass sheet G slides downward and inward over surface 12 as the plunger 32 impresses its hemispherical shape onto the glass. FIG. 4 shows the relation of the plunger and the glass to the ring during an intermediate portion of the bending cycle when the glass sheet margin is engaging the lower, inner sloping ledge 20 of the ring 10 with the plunger having impressed its shape onto the glass almost completely.

The plunger 32 continues to impress its shape on the glass sheet and finally forces the glass sheet G to slide off the lower inner edge 16 of the ring 12 and deposits the shaped glass sheet on the pad 30. However, the bent glass usually embraces the plunger 32 so intimately that it becomes necessary to remove the shaped glass from the mod. An airblast of about 0.1 second at 80 pounds per square inch through the air line 38 and through an aperture 36 formed by drilling a hole with a No. 70 drill helps remove the bent glass from intimate contact with the downwardly facing spherical surface of the mold without damaging the glass hemisphere. The pad 30 is located concentrically with the ring 10 and is in a horizontal plane about one-half inch below the lowest portion of the bent hemisphere in the lowest plunger position allowed. Stops and other means well known in the art, such as limiting the length of the externally threaded shaft, control this lowest plunger position. It has been determined that a free fall of ½-inch thick hemisphere onto a supported asbestos pad of a distance of about one-half inch does not harm the glass.

As an alternative, the plunger can be of the type disclosed in U.S. Pat. No. 3,414,395 to Thomas J. Reese and Russell J. Corsi, the disclosure of which is incorporated herein by reference. In such a case, the plunger is lifted to a position providing clearance for inserting the glass on the ring and is lowered to contact the upper surface of the glass sheet G before inserting the glass laden mold into a bending and annealing lehr. As the glass is heated, it slides own the support ring 10, with the weight of the plunger and its accessory stop structure helping to accelerate the rate of glass sagging until further downward movement of the plunger is stopped when the plunger moves slightly below the ring 10 and slightly above the pad 30.

After the bending is completed, the bent glass hemisphere G with its lower surface resting on the pad as illustrated in FIG. 5, has its surface exposed to the furnace atmosphere and is capable of more rapid annealing than when the bent glass hemisphere is supported on a ceramic mold. The glass is spaced from the steel structure of the plunger 32 and ring 10, and, in case the plunger can be raised, such raising is done to remove the plunger from the vicinity of the bent hemisphere. This facilitates controlled cooling of the hemisphere. The refractory pad 30 is preferably of asbestos or fiber glass composition, so that it has small thermal capacity and provides minimum problem in cooling the bent hemisphere at a controlled rate through the annealing range of the glass because the pad has heat exchange properties similar to those of the glass hemisphere.

When the glass hemisphere cools to handling temperature the jackscrew 26 lowers the floor 24 and the glass hemisphere is removed from the furnace, its surfaces, including the equatorial edge surface, are ground and polished, and a pair of hemispheres bound together at their equatorial edge surfaces, preferably using the technique described and claimed in the aforesaid U.S. Pat. No. 3,450,082 to Henry M. Demarest.

The present invention provides a technique wherein the time required to shape a hemisphere 10 inches in diameter and ½-inch thick, which takes about 2 hours to accomplish by a pure gravity sagging technique at a temperature below which the glass devitrifies, has been reduced to as little as 8 minutes. The time saved for other sizes and thicknesses is commensurate with the time savings obtained with the hemisphere bending operation described in the illustrative embodiment recited above.

What is claimed is:

1. Apparatus for shaping a heat-softened glass sheet into a spherical portion comprising a circular support ring for initially supporting said glass sheet for shaping, a plunger having a downwardly facing spherical wall for contacting the upper surface of said glass sheet, and having a diameter less than the support ring by approximately twice the thickness of said glass sheet, a support pad disposed below said support ring for receiving said glass sheet after shaping, and means for moving said plunger from a position above said support ring to a position below said support ring and in spaced relation above said support pad to extrude said heat-softened glass sheet into the shape of a spherical portion.

2. Apparatus as in claim 1, wherein said support pad is disposed below said support ring a vertical distance approximately one-half inch greater than the radius of the sphere defining the sphericall portion to which the glass sheet is to be bent for receiving said glass sheet after shaping.

3. Apparatus as in claim 1, wherein said convex wall is apertured and means is provided for forcing air under pressure through said apertured wall to release a bent sheet of glass from said plunger.

4. Apparatus as in claim 1, wherein said means for moving said plunger is arranged for moving said plunger along a vertical axis and said ring comprises an outer edge portion forming a circular horizontal ledge and an inner edge portion forming a frustoconical ledge that extends downward and inward from said horizontal ledge.

5. Apparatus as in claim 1, wherein said convex wall is in the form of a hemisphere.

6. Apparatus as in claim 5, wherein said support ring has an inner edge whose radius exceed the radius of said plunger by a distance approximately equal to the thickness of a glass sheet undergoing shaping.

7. Apparatus as in claim 1, further including a circular furnace having an upper portion supporting said means for moving said plunger moving means and a movable floor supporting said support ring.

8. A method of bending a glass sheet into a hemisphere comprising supporting said glass sheet with its lower surface on the upper surface of a support ring, heating said sheet to its deformation temperature while lowering a plunger having a diameter less than the support ring by approximately twice the thickness of said glass sheet into pressurized contact with its upper surface, extruding said sheet through said support ring to form said sheet to its desired shape while the lower surface of said sheet is out of contact with a solid member, and depositing the sheet so formed on a refractory member having a different curvature than and heat exchange properties similar to those of said glass hemisphere.

9. The method as in claim 8, further including cooling said hemisphere through the annealing range of glass at a controlled rate while supported at its lower surface on said refractory member.

10. The method as in claim 8, wherein said plunger is lowered intermittently to permit said heated glass sheet to recover its elasticity between said intermittent lowerings.